United States Patent
Loo et al.

(10) Patent No.: US 11,080,792 B1
(45) Date of Patent: *Aug. 3, 2021

(54) TOTAL COST OF VEHICLE OWNERSHIP

(71) Applicant: Allstate Insurance Company, Northbrook, IL (US)

(72) Inventors: William Loo, Arlington Heights, IL (US); Stephen Hughes, Belfast (GB); James Gillespie, Belfast (GB); Jennifer A. Brandmaier, Chicago, IL (US); Daniel Koza, Hinsdale, IL (US)

(73) Assignee: Allstate Insurance Company, Northbrook, IL (US)

( * ) Notice: Subject to any disclaimer, the term of this patent is extended or adjusted under 35 U.S.C. 154(b) by 133 days.

This patent is subject to a terminal disclaimer.

(21) Appl. No.: 16/415,518

(22) Filed: May 17, 2019

Related U.S. Application Data

(63) Continuation of application No. 13/592,413, filed on Aug. 23, 2012, now Pat. No. 10,332,208.

(51) Int. Cl.
 *G06Q 40/08* (2012.01)
 *G06Q 30/06* (2012.01)
 *G06Q 40/06* (2012.01)

(52) U.S. Cl.
 CPC ............ *G06Q 40/08* (2013.01); *G06Q 30/06* (2013.01); *G06Q 40/06* (2013.01)

(58) Field of Classification Search
 None
 See application file for complete search history.

(56) References Cited

U.S. PATENT DOCUMENTS

| | | |
|---|---|---|
| 5,323,315 A | 6/1994 | Highbloom |
| 6,233,563 B1 | 5/2001 | Jefferson et al. |
| 7,194,436 B2 | 3/2007 | Tammaro |
| 7,409,221 B2 | 8/2008 | Obradovich et al. |
| 7,571,128 B1 | 8/2009 | Brown |
| 7,890,355 B2 | 2/2011 | Gay et al. |
| 7,991,629 B2 | 8/2011 | Gay et al. |
| 8,121,938 B1 | 2/2012 | Zettner et al. |

(Continued)

FOREIGN PATENT DOCUMENTS

| | | |
|---|---|---|
| JP | 2001109793 A | 4/2001 |
| KR | 20010044544 A | 6/2001 |

(Continued)

OTHER PUBLICATIONS

NPL:Carfax Auto Loans: Great Values on Car, Truck, and Van Financing.pdf; captured Mar. 19, 2012.

(Continued)

*Primary Examiner* — Joseph W. King
(74) *Attorney, Agent, or Firm* — Banner & Witcoff, Ltd.

(57) ABSTRACT

A total cost of ownership (TCO) of a vehicle may be calculated based on received information identifying a vehicle, and retrieved vehicle data corresponding to the vehicle, such as vehicle insurance records, maintenance records, and vehicle operation sensor data. Additional information may be received identifying one or more entities associated with the vehicle, for example, a potential buyer and a potential seller of the vehicle Data may be retrieved corresponding to the entities associated with the vehicle, and a TCO calculation for a vehicle may be based on the vehicle data and additional information retrieved corresponding to the entities associated with the vehicle.

20 Claims, 5 Drawing Sheets

(56) References Cited

U.S. PATENT DOCUMENTS

| | | |
|---|---|---|
| 8,296,191 B1 | 10/2012 | Foo et al. |
| 8,392,294 B2 | 3/2013 | MacInnis |
| 8,571,951 B2 | 10/2013 | Diana et al. |
| 8,706,616 B1 | 4/2014 | Flynn |
| 2002/0107765 A1 | 8/2002 | Walker |
| 2002/0116328 A1 | 8/2002 | Bird et al. |
| 2005/0004860 A1 | 1/2005 | Pretell et al. |
| 2005/0161505 A1 | 7/2005 | Yin et al. |
| 2006/0047383 A1 | 3/2006 | Kwon |
| 2006/0138222 A1 | 6/2006 | Dearie |
| 2007/0011083 A1 | 1/2007 | Bird et al. |
| 2007/0050287 A1 | 3/2007 | Capozza |
| 2007/0136162 A1 | 6/2007 | Thibodeau et al. |
| 2007/0136163 A1 | 6/2007 | Bell |
| 2007/0156468 A1 | 7/2007 | Gay et al. |
| 2008/0027856 A1 | 1/2008 | Owens et al. |
| 2010/0174564 A1 | 7/2010 | Stender et al. |
| 2010/0191674 A1 | 7/2010 | Condon |
| 2010/0205012 A1 | 8/2010 | McClellan |
| 2011/0040579 A1 | 2/2011 | Havens |
| 2011/0093159 A1 | 4/2011 | Boling et al. |
| 2011/0099099 A1 | 4/2011 | Rivest et al. |
| 2011/0153367 A1 | 6/2011 | Amigo et al. |
| 2011/0161206 A1 | 6/2011 | Mateer et al. |
| 2011/0264552 A1 | 10/2011 | Seergy et al. |
| 2011/0270659 A1 | 11/2011 | Crites |
| 2011/0303750 A1 | 12/2011 | Wang |
| 2013/0046593 A1 | 2/2013 | Kanel et al. |

FOREIGN PATENT DOCUMENTS

| | | |
|---|---|---|
| KR | 20030040715 A | 5/2003 |
| WO | 2011031629 A2 | 3/2011 |

OTHER PUBLICATIONS

NPL: Wells Fargo Used Car Loan.pdf, webpage captured on Mar. 19, 2012.

NPL:Capitol One Used Auto Financing with a Blank Check, webpage captured Mar. 19, 2012.

Feb. 18, 2016—U.S. Non Final Office Action—U.S. Appl. No. 13/592,413.

Oct. 3, 2016—U.S. Office Action—U.S. Appl. No. 13/592,413.

Mar. 28, 2017—U.S. Office Action—U.S. Appl. No. 13/592,413.

Nov. 2, 2017—U.S. Final Office Action—U.S. Appl. No. 13/592,413.

Aug. 10, 2018—U.S. Non-Final Office Action—U.S. Appl. No. 13/592,413.

Feb. 4, 2019—U.S. Notice of Allowance—U.S. Appl. No. 13/592,413.

TOTAL COST OF VEHICLE OWNERSHIP

CROSS REFERENCE TO RELATED APPLICATIONS

This application is a continuation of and claims priority to U.S. patent application Ser. No. 13/592,413, filed Aug. 23, 2012, which is incorporated herein by reference.

BACKGROUND

The cost of owning a vehicle is more than just the vehicle's purchase price. A current owner or a potential buyer of a new or used vehicle may also desire to know an estimate of the expected costs over a period of time associated with the use and ownership of the vehicle. The total cost of ownership (TCO) of a vehicle provides such an estimate. A total cost of ownership calculation may involve several factors, for example, a vehicle's depreciation costs, estimated fuel costs, estimated insurance costs, estimated maintenance and repair costs, estimated state and/or local fees and taxes, and/or interest payments. Each of these factors may be calculated for a number of years into the future to provide an estimate of the expected expenditures that will accompany ownership and use of a vehicle over time. Such calculations may allow owners and potential buyers to be better informed in their decisions about buying and selling vehicles.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to methods, computer-readable media, and apparatuses for calculating a total cost of ownership (TCO) of a vehicle. Information identifying a vehicle may be received at a system, for example, via a TCO estimation application on a personal computer, mobile device, or other remote terminal. The vehicle identifying information may be a Vehicle Identification Number (VIN), VIN tag, license information, or other vehicle identifier. Based on the vehicle identifying information, the system may retrieve additional data corresponding to the vehicle, including general vehicle information and unique, vehicle-specific data, such as vehicle insurance records, vehicle maintenance records, and vehicle operation data collected by sensors within the vehicle. The system may then calculate a TCO for the vehicle based on the retrieved vehicle data.

In accordance with further aspects of the present disclosure, additional information may be received identifying one or more entities associated with the vehicle, for example, a prospective buyer and/or prospective seller of the vehicle. The system may retrieve additional data corresponding to the prospective buyer and seller entities, such as driving records, demographic data, insurance records, maintenance records of one or more other vehicles associated with the buyer or seller, and vehicle operation data collected by sensors of one or more vehicles associated with the buyer or seller. The calculation of the total cost of ownership of the vehicle may be based on the retrieved vehicle data, as well as the additional data relating to the prospective buyer and/or seller of the vehicle.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
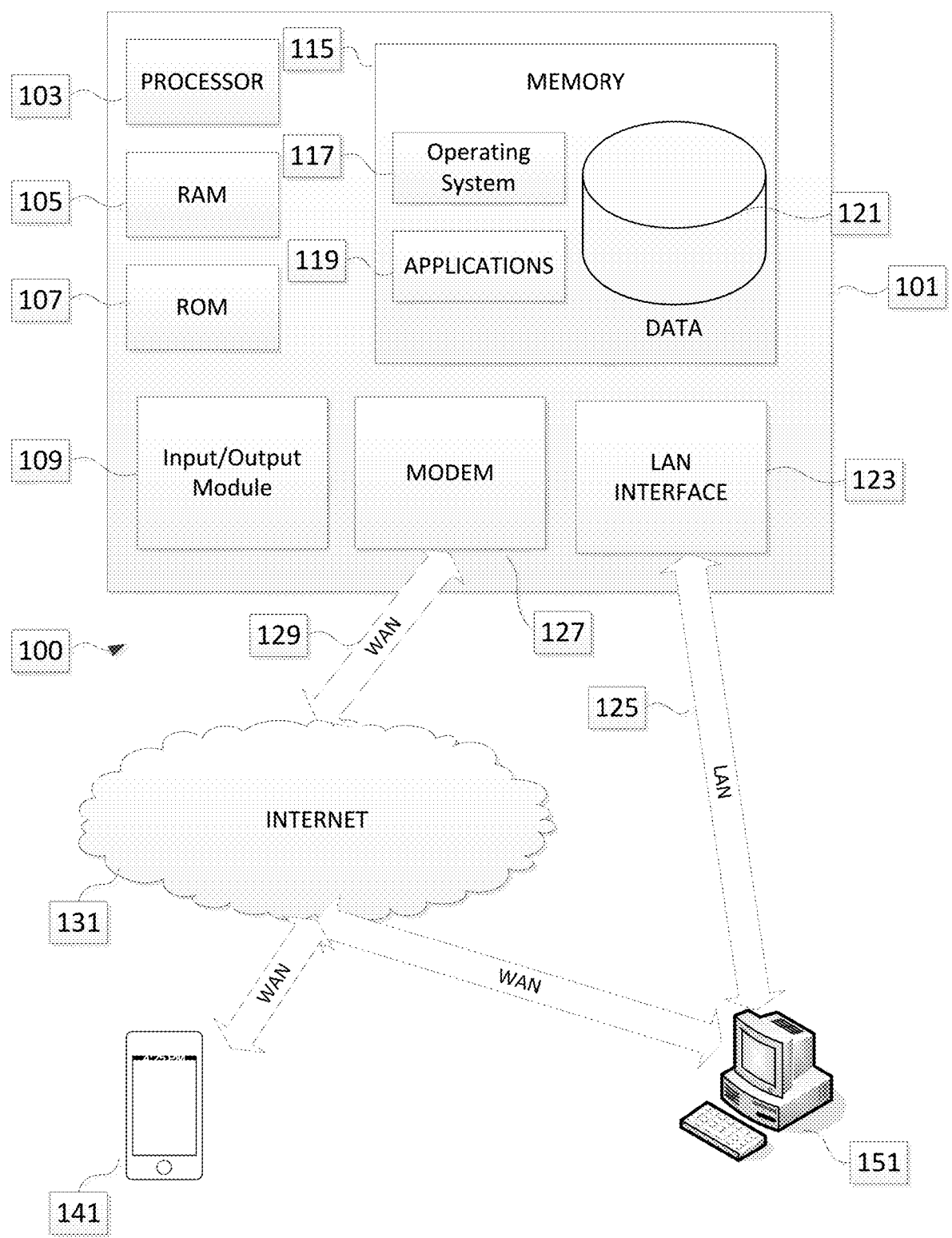
FIG. 1 illustrates a network environment and computing systems that may be used to implement aspects of the disclosure.

FIG. 1 illustrates a block diagram of a computing device (or system) 101 in communication system 100 that may be used according to one or more illustrative embodiments of the disclosure. The computing device 101, along with one or more additional devices (e.g., terminals 141, 151) may correspond to any of multiple systems or devices configured to analyze and determine the total cost of ownership (TCO) of vehicles. As discussed below, the TCO of a vehicle refers to the estimated direct and indirect costs associated with the use and ownership of the vehicle for a period of time, usually specified in years. The device 101 may have a processor 103 for controlling overall operation of the device 101 and its associated components, including RAM 105, ROM 107, input/output module 109, and memory 115.

Input/Output (I/O) 109 may include a microphone, keypad, touch screen, and/or stylus through which a user of the computing device 101 may provide input, and may also include one or more of a speaker for providing audio output and a video display device for providing textual, audiovisual and/or graphical output. Software may be stored within memory 115 and/or storage to provide instructions to processor 103 for enabling device 101 to perform various functions. For example, memory 115 may store software used by the device 101, such as an operating system 117, application programs 119, and an associated internal database 121. Processor 103 and its associated components may allow the vehicle cost estimation system 101 to execute a series of computer-readable instructions to receive information identifying a vehicle and one or more entities associated with the vehicle (e.g., a potential buyer and/or seller), retrieve data corresponding to the vehicle and the entities, compute a TCO for the vehicle, and output the TCO.

The vehicle cost estimation system 101 may operate in a networked environment 100 supporting connections to one or more remote computers, such as terminals 141 and 151. The terminals 141 and 151 may be personal computers (e.g., end-user customer computers), servers (e.g., web servers, database servers), mobile communication devices, portable computing devices and the like that include many or all of the elements described above with respect to the vehicle cost estimation system 101. The network connections depicted in FIG. 1 include a local area network (LAN) 125 and a wide area network (WAN) 129, but may also include other networks. When used in a LAN networking environment, the vehicle cost estimation system 101 may be connected to the LAN 125 through a network interface or adapter 123. When used in a WAN networking environment, the vehicle cost estimation system 101 may include a modem 127 or other means for establishing communications over the WAN 129, such as network 131 (e.g., the Internet). It will be appreciated that the network connections shown are illustrative and other means of establishing a communications link between the computers may be used. The existence of any of various well-known protocols such as TCP/IP, Ethernet, FTP, HTTP and the like is presumed.

Additionally, one or more application programs 119 used by the vehicle cost estimation device/system 101 may include computer executable instructions for receiving data identifying a vehicle and entities associated with the vehicle, retrieving data corresponding to the vehicle and the entities associated with the vehicle, computing a TCO for the vehicle, outputting the TCO, and performing other related functions as described herein.

Figure 2:
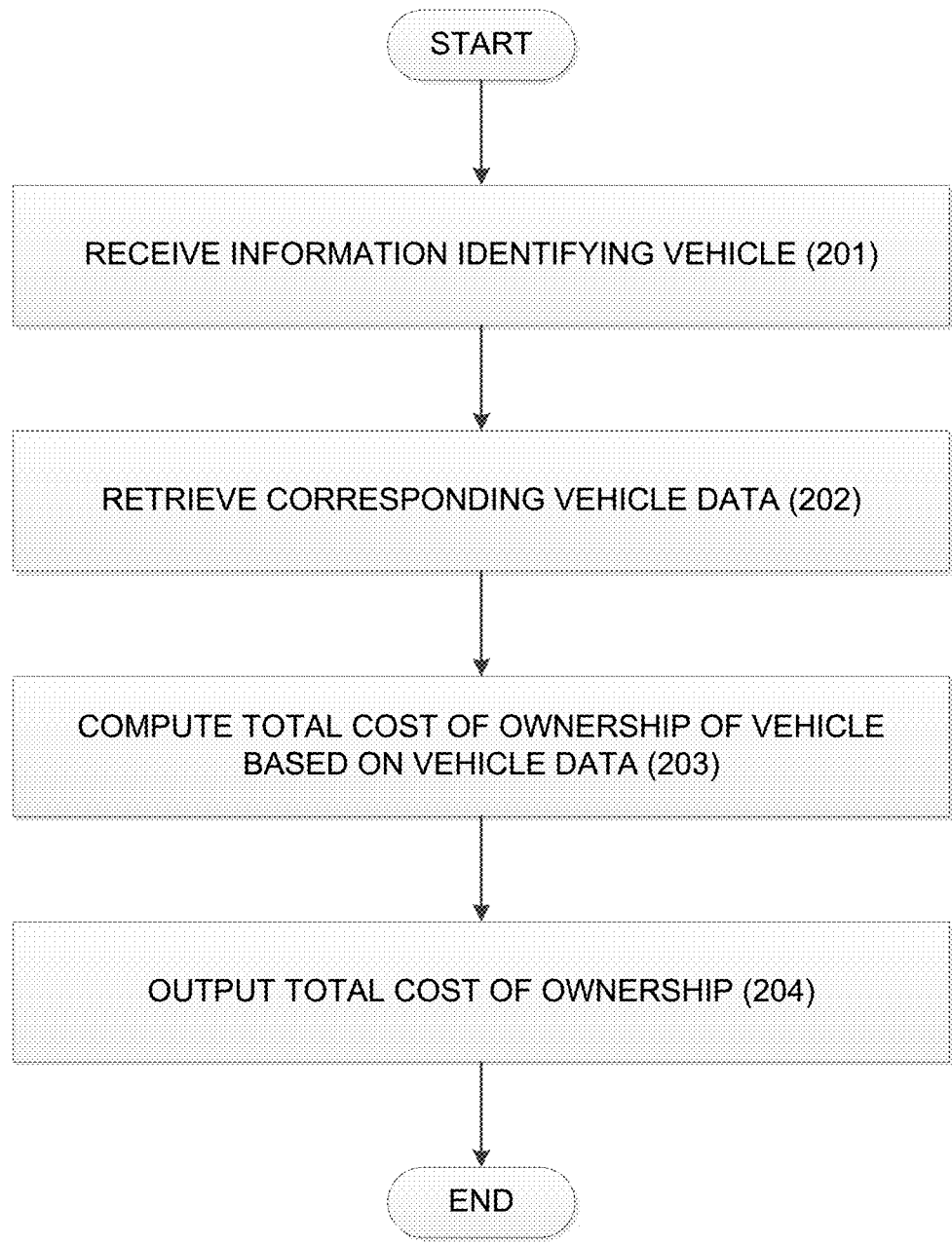
FIG. 2 is a flow diagram illustrating an example method of calculating a total cost of ownership for a vehicle based on vehicle identifying information according to one or more aspects of the disclosure.

FIG. 2 is a flow diagram illustrating an example method of calculating a TCO for a vehicle. The steps in the example method may be performed by one or more computing devices 101 (e.g. computer servers and associated server software) in a vehicle cost estimation system. In certain examples, one or more of these steps and other various vehicle cost estimation functions may be performed by one or more additional computing devices in the communication system 100, such as the terminals 141 and 151.

In step 201, information identifying a vehicle may be received by the vehicle cost estimation device/system 101. The information identifying a vehicle may refer to data that uniquely identifies a vehicle, for example, license plate number and jurisdiction, Vehicle Identification Number (VIN), manufacturer proprietary tags, etc. The information received in step 201 also may be general (i.e., non-unique) vehicle identifying information, for example, a vehicle make, model, engine type, year, mileage, and/or condition, etc.

In the United States, a VIN may be composed of 17 digits and characters that uniquely identify a vehicle. In addition to uniquely identifying a vehicle, the VIN may contain additional encoded information about the vehicle, such as the vehicle manufacturer, certain attributes of the vehicle (e.g., make, model, engine type, and body type), a manufacturing plant code, and the model year of the vehicle. This additional information may vary according to the type of the vehicle (e.g., passenger car, multipurpose passenger car, bus, truck, motorcycle). The VIN may also contain a check digit for validating the other digits in the VIN. The VIN may appear on one or more VIN tags, at one or more locations on the vehicle (e.g., near the dashboard, on a door, on the engine block). In addition to the VIN tags, the VIN may also be found on the vehicle registration card, insurance card, and/or other documents associated with the vehicle.

Figure 5A:
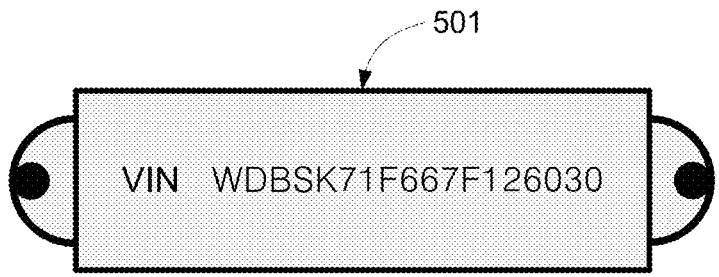
FIGS. 5A-5C illustrate three examples of VIN tags that may be used according to one or more aspects of the disclosure.
Figure 5B:
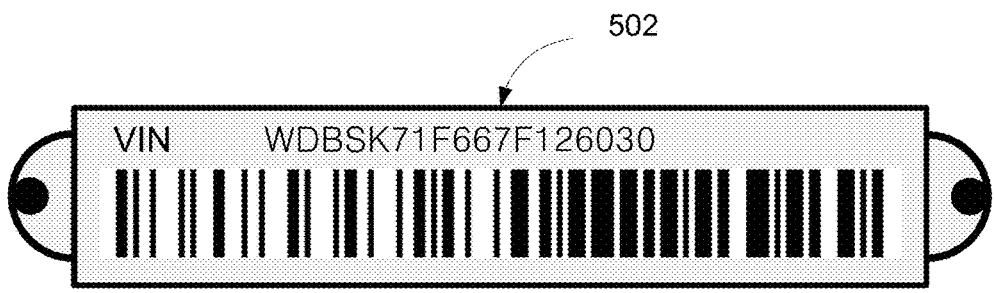
Figure 5C:
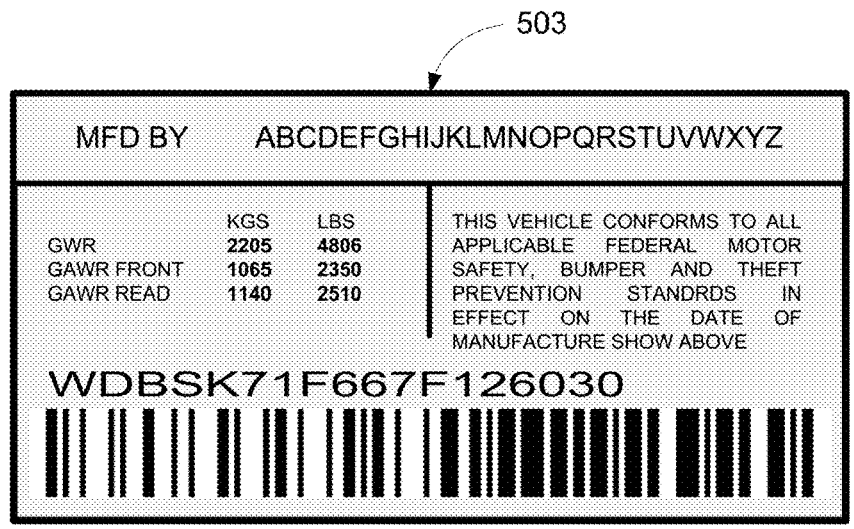

Referring briefly to FIGS. 5A-5C, three examples of different types of VIN tags are shown. FIG. 5A shows a VIN tag 501 that transcribes the VIN in text. FIG. 5B shows a VIN tag 502 that transcribes the VIN in a text and barcode format. FIG. 5C shows a VIN tag 503 that transcribes the VIN in a text and barcode format, and includes other information associated with the vehicle. VIN tags different than those shown in FIGS. 5A-5C are also possible. The vehicle cost estimation systems and methods described herein do not depend on any specific type of VIN, VIN tag, or VIN tag location.

Referring again to step 201, the vehicle cost estimation system 101 may receive vehicle identifying information from various different types of devices, and in various different formats. Devices that may communicate with the vehicle cost estimation system 101 may include, for example, personal computers, mobile devices, and the like. Such devices may transmit vehicle identifying information to the vehicle cost estimation system 101 over a computer network (e.g., the Internet 131 or other computer network using a dedicated connection LAN interface 125 or WAN interface 129), or using another communication network (e.g., wireless mobile, cable, and/or telephone networks, etc.) using one or more communication methods (e.g., web-based or computer application data transmissions, email, SMS, voice, and the like). For example, when a user decides to perform a TCO calculation for a vehicle (e.g., the user's own vehicle, or a vehicle the user is considering purchasing), the user may begin the TCO estimation process by starting an application (e.g., a web-based on standalone application) on a personal computer or mobile device, and inputting the VIN of the vehicle into the application. The TCO estimation application may transmit the VIN to the system 101 over a communication network, for example, via a web page over the Internet, as an SMS message, over a wireless network, or other various network transmission techniques.

The vehicle identifying information may be sent by a user device and received by the vehicle cost estimation system 101 in various different formats. In certain embodiments, this vehicle information may be received as text input from the user's device or other remote terminal. For example, a user may input a VIN to a computer terminal 151 using a keyboard connected to the computer and transmit the VIN to the vehicle cost estimation system 101 via the Internet 131 or other communication network. In other embodiments, the vehicle cost estimation system 101 may receive the VIN as a digital image. For example, a user (e.g., prospective buyer of a vehicle, or a used-car dealer) desiring to perform a TCO calculation for a vehicle may capture a digital image of a VIN tag using a mobile device with a built-in digital camera (e.g., via a TCO estimation software application configured to capture digital images). The TCO estimation application may then transmit the digital image from the user's device to the vehicle cost estimation system 101. After receiving the digital image of a VIN or VIN tag, the vehicle cost estimation system 101 may analyze the digital image using standard image processing techniques to identify the VIN. Alternatively, a TCO estimation software application on the user's device may be capable of directly analyzing a VIN tag image and determining the vehicle's VIN. In such a case, the user's device (e.g., mobile phone, PC or other computing device) may locally perform the VIN recognition, and then transmit the identified VIN to the vehicle cost estimation system 101. In other embodiments, the vehicle information may be read from a VIN barcode and transmitted to the vehicle cost estimation system 101. For example, the TCO estimation software application executing on the user's device 141 may be capable of scanning and/or analyzing a barcode, and communicating the VIN information with the vehicle cost estimation system 101. The user may scan a VIN tag containing the barcoded VIN (e.g. VIN tags 502 or 503) using a mobile device 141, and may then analyze the barcode to retrieve the VIN. The mobile device may then transmit the retrieved VIN to the system 101 over the Internet, via SMS, or other communication network. Alternatively, the system 101 may receive the VIN barcode from the user's device as a digital image, and then analyze the image containing the barcode to determine the VIN.

After receiving the VIN or other vehicle identifying information, the vehicle cost estimation system 101 may check the validity of the received identifying information. For example, in the United States, the ninth digit of a VIN is a check digit that may be used to validate the other digits in the VIN. In certain embodiments, the system 101 may directly perform check digit validation on a VIN or VIN tag by calculating an expected value of the ninth digit based on the other digits in the VIN, and then comparing the expected value to the actual value of the ninth digit. In other embodiments, the user's device (e.g., a user's mobile device or other remote terminal) may perform the VIN validation locally. Either the user's device 141 or the vehicle cost estimation system 101 may communicate with a third-party server configured to validate the VIN. The vehicle cost estimation system 101 and/or the user's device also may compare other vehicle information (e.g. the vehicle model, year of manufacture, engine type, etc.) decoded from the VIN with any other available vehicle information to confirm that the information matches. As an example, the vehicle cost estimation system 101 may receive a VIN and then determine the vehicle data (e.g., make, model and year of the vehicle) based on the VIN. The system 101 may then retrieve the same vehicle data from a different data source (e.g., a state DMV database, manufacturer records, insurance records, etc.) using the received VIN, license plate data, or other vehicle information. The system 101 may then compare the data derived from the VIN with the data retrieved from the third-party data sources to confirm that the information matches. The system 101 may also transmit the retrieved vehicle data (e.g., make, model, year, etc.) to the user's device, so that the user may confirm that the information retrieved by the system 101 matches the vehicle from which the user input the VIN or other identifying information. If the system 101 or the user determines that the vehicle information does not match, for example, if the vehicle has an invalid VIN or if the make and model of the vehicle do not match the make and model encoded into the vehicle's VIN, then the system 101 may, automatically or upon receiving an input or confirmation from the user, notify one or more parties of the mismatched or invalid vehicle information. For example, an invalid VIN may indicate potentially fraudulent or illegal activities, and mismatched vehicle information may indicate that the vehicle has been rebuilt or undergone significant maintenance. Accordingly, the TCO estimation application executing at the system 101 or the user's device 141 may be configured to detect an invalid VIN or mismatched vehicle information and then notify the user, law enforcement, or an insurance company or other party associated with the vehicle or the user.

In step 202, the vehicle cost estimation system 101 may retrieve data corresponding to the vehicle using the vehicle information received in step 201. The vehicle cost estimation system 101 may retrieve data from one or more data sources (e.g., databases, electronic file systems, online applications, etc.) maintained internally or externally by one or more different entities. For example, the vehicle cost estimation system 101 may retrieve vehicle-specific data from an insurance company associated with the vehicle, a state Department of Motor Vehicles (DMV) or other governmental database, the manufacturer or dealer associated with the vehicle, an entity monitoring operational/driving sensors in the vehicle, and/or various other data sources.

The data sources described above may contain a variety of information about one or more specific vehicles identified in step 201. For example, databases of insurance companies may contain vehicle information such as the insurance claims filed on the vehicle, details of any structural or non-structural damage, records of the vehicle being stolen, and the like. Vehicle manufacturer databases may contain information such as the demand for the vehicle in the national, state and local markets, the vehicle's miles per gallon (MPG) rating, recommended maintenance schedules for the vehicle, costs of parts and labor for various maintenance and repairs, and the like. Databases of vehicle dealerships, service locations, and repair shops may include information such as the vehicle's odometer reading (e.g., from the vehicle's most recent service visit), the schedule and frequency of the vehicle's visits to the dealership for scheduled maintenance or other repairs, any records of incomplete repairs or parts in need of replacement, information about the structural condition of the vehicle, the costs of servicing the vehicle, the status of existing warranties, and the like. State DMVs and other governmental databases may include information such as title issues with the vehicle (e.g., the vehicle's title designates the vehicle as salvage, rebuilt, junk, dismantled, or non-repairable), instances of tampering with the odometer, whether the vehicle is designated as a lemon under state law (i.e., generally a new vehicle purchased from a licensed dealer that has chronic mechanical problems that cannot be repaired despite numerous attempts), the state sales tax rate applicable to the sale of the vehicle, any eligibility for tax credits associated with the vehicle (e.g., for low emission vehicles), and the like.

A vehicle may also be equipped with sensors to record various operational parameters of the vehicle, for example, the vehicle's fuel consumption, rates of acceleration or braking, distances driven, oil levels, instances of sudden acceleration, braking, and air bag deployment, instances and intensities of impacts on the structure of the vehicle. For vehicles configured to detect and record operational driving data, this data may be stored at the vehicle, or may be transmitted to a manufacturer, an insurance provider, or other external locations to record this operational driving data. For example, the vehicle's sensors may collect and transmit the data to an insurance company that maintains a telematics database for receiving and storing data from a vehicle's operational sensors of its customers. The insurance company and its customers may then use the operational driving data to negotiate discounts on insurance purchases based on the customer's good driving habits. In these examples, the vehicle cost estimation system 101 may use the VIN or other vehicle identifying information to access and retrieve such vehicle operational driving data from one or more of these data sources.

In step 203, the vehicle cost estimation system 101 may compute the Total Cost of Ownership (TCO) of the vehicle based on the vehicle-specific information retrieved in step 202. As described above, the TCO of a vehicle may be a financial estimate of the costs associated with the use and ownership of a vehicle over time. Several cost factors may be included in a TCO calculations, for example, a vehicle's depreciation costs, estimated fuel costs, estimated insurance costs, estimated maintenance and repair costs, estimated state and/or local fees and taxes, interest payments, etc. Certain factors in the TCO calculation may involve costs that do not include actual expenditure by the vehicle owner/user, for example, depreciation (i.e., the estimated decline in the value of the vehicle over a future period of time). Depreciation represents a reduced price at which the vehicle may be subsequently resold, but does not involve any actual outflow of money by the owner during the period of ownership. In contrast, other TCO factors (e.g., fuel costs, insurance, maintenance, taxes and fees, etc.) may involve actual outflow of money by the owner during the period of ownership. A TCO may be computed over a period of years (e.g., 1 year, 2 years, . . . , 5 years, . . . , 10 years, etc.), which may be predetermined by the vehicle cost estimation system 101, or may be specified by a user of the system 101. Various factors that may be used in computing the TCO of a vehicle over a specified time period are described below.

In the TCO calculation of step 203, various cost factors may be determined based on the vehicle-specific information, and may be added together to compute the TCO for the vehicle. For example, the system 101 may calculate the TCO by adding together estimated depreciation costs, estimated fuel costs, estimated insurance costs, estimated maintenance and repair costs, estimated state and/or local fees and taxes, and/or interest payments, etc. If the system 101 is unable to obtain or compute one or more of these cost factors from the various data sources that have vehicle-specific information, the system 101 may make assumptions about certain cost factors. For example, a vehicle might not have any operational sensors, or the system 101 may be unable to access a database comprising the vehicle's operational sensor data. Accordingly, certain vehicle-specific information, such as the vehicle's fuel consumption rate, and the precise mileage and driving patterns of the vehicle may be unknown. In this example, the system 101 may use default values for these cost factors within the TCO calculation, for example, by using a default MPG rating for the vehicle's make, model, and year, which may be retrieved from a vehicle manufacturer's database or other data source. The system 101 also may assume a default value for driving distance (e.g., 15,000 miles per year) if more precise vehicle-specific information cannot be retrieved, for example, from vehicle sensor data, insurance records, or maintenance records associated with the vehicle). The system 101 may also determine that certain unknown or unavailable cost factors may be ignored in a TCO calculation. For example, the system 101 may be unable determine an amount of state fees and taxes associated with the vehicle. Certain states might not levy state fees and taxes on certain vehicles, and the state in which the vehicle is currently registered (or will be registered in the future) may be unknown. In this example, the system 101 may ignore state taxes and fees in computing the TCO for the vehicle.

In certain embodiments, the system 101 may compute an initial TCO for the vehicle using default values for some or all of the various cost factors used in the TCO calculation, and then may adjust the initial TCO calculation based on the available vehicle-specific data received in steps 201 and 202. For example, the system 101 may initially assume that the vehicle has been driven 15,000 miles per year, that 55 percent of the distance the vehicle is driven has been on highways, that the insurance premium for the vehicle will be the average annual insurance premium for the state in which the vehicle is registered, that the state fees and taxes for the vehicle will be the average local and county taxes assessed in the state, that the fuel costs for the vehicle will be the average national fuel price, and/or one or more additional assumptions. Then the system 101 may adjust the various cost factors up or down based on the vehicle-specific data obtained in step 202 that may be different from the values assumed by the system 101. For example, the system 101 may determine from the vehicle's operational sensors, maintenance or insurance records, or other sources, that the vehicle has been only driven 10,000 miles per year, rather than the assumed rate of 15,000 miles per year. Accordingly, the system 101 may decrease the TCO based on the newly received vehicle-specific mileage information. Similarly, the system 101 may determine based on the vehicle's maintenance history that the vehicle is in need of several repairs, and accordingly the system 101 may increase the TCO based on the vehicle-specific maintenance information.

As indicated above, the TCO calculation in step 203 may incorporate the estimated cost of fuel that will be consumed by the specific vehicle during the TCO period. Fuel costs for the vehicle may depend on several factors, for example, the vehicle's miles per gallon (MPG), the distance the vehicle will be driven over the TCO period, the type of fuel (e.g., gasoline, gasoline with additives, diesel, etc.) that the vehicle uses, and cost per gallon of fuel in the geographic region that the vehicle will be driven. The vehicle cost estimation system 101 may determine one or more of the MPG of the vehicle, the estimated distance the vehicle has been driven, and the type of fuel the vehicle uses from data collected from the vehicle's operational sensors. For example, a TCO estimation application executing on a mobile device 141 may access and retrieve the vehicle's sensor data from the vehicle, and may transmit the sensor data to the system 101. The system 101 also may retrieve the vehicle's sensor data from a telematics database of a vehicle manufacturer, an insurance company, or other database that receives and stores vehicle sensor data. The system 101 may also determine the cost of fuel from a third-party database that includes national and/or regional gasoline price indexes. In other examples, a user may input and transmit an estimated fuel price to the system 101 via a TCO estimation application on a mobile device 141 or a computer terminal 151. Some or all of the retrieved data may be used in computing a fuel cost factor for the vehicle's TCO. For example, although data retrieved from a manufacturer's database may indicate that the MPG rating of vehicle is 60 MPG, the data retrieved from the vehicle's sensors may show that the vehicle only operates at 45 MPG. In this example, an initial TCO computation may use the 60 MPG rating received from the manufacturer's database, but the system 101 may then update the TCO computation after receiving the vehicle-specific 45 MPG rating from a vehicle operational sensor database. In this case, the system 101 may calculate an increase in the initial TCO because the vehicle's actual fuel rating of 45 MPG is lower than the initial manufacturer's estimated rating of 60 MPG, thus resulting in 33% higher fuel consumption and fuel costs for the vehicle.

The TCO calculation also may incorporate the estimated maintenance and repair costs of the specific vehicle over the TCO period. These costs may depend on various data factors including, for example, the manufacturers' specified servicing schedule for the vehicle and the actual condition of the vehicle. The vehicle cost estimation system 101 may retrieve the maintenance records of the vehicle, including compliance data with the manufacturer's specified maintenance schedule, existing warranties, unrepaired defects, structural defects, and the like from various data sources such as the vehicle's operational sensor data, vehicle dealer or repair shop records for the vehicle, manual input at a user device 141, and/or other data sources. The system 101 may use the vehicle's VIN to retrieve some of this data (e.g., manufacturer's schedule for maintenance, existing warranties for the vehicle, maintenance costs of parts and labor, etc.) from a manufacturer's database. The system 101 may use the VIN or vehicle's license plate number to retrieve additional data (e.g., unrepaired defects, costs of various repairs, structural defects, and unscheduled repairs) from a vehicle dealership or repair shop database. The system 101 may then use this data to estimate the cost of repairs that the vehicle may require over the TCO period. As an example, two vehicles, A and B, may have the same manufacturer, model, and year of manufacture. However, vehicle-specific data retrieved from the vehicle dealership using vehicle A's VIN or license plate may show that vehicle A has no unrepaired defects and has been brought for routine servicing according to the manufacturer's schedule. In contrast, retrieved data on vehicle B may show that vehicle B was not brought in for regularly scheduled servicing, and that several repairs may be needed on vehicle B in the near future. In this example, the system 101 may compute a higher TCO for vehicle B than vehicle A, based on the higher estimated costs of maintenance and repairs.

The TCO calculation may also incorporate the vehicle's estimated depreciation in value over the TCO period. The vehicle's depreciation in value over the specified TCO period may be affected by various factors, such as the type of the vehicle's title. Certain title types like salvage, reconstructed etc., may increase the vehicle's rate of depreciation. The vehicle's estimated depreciation may also be affected by the demand of the vehicle's make, model, year, and engine type in the market, the existing condition of the vehicle, whether the vehicle is designated as a lemon by the state, and any governmental incentives for buying the vehicle (e.g., tax credits for buying a new vehicle, or a gas-electric hybrid vehicle, etc.). The depreciation calculation may also take into account whether the vehicle was ever totaled, or stolen, etc. In these examples, the vehicle cost estimation system 101 may use the VIN, license plate number, or other identifying information of the vehicle to retrieve data related to the vehicle's estimated depreciation from a state's DMV database (e.g., type of title, whether the vehicle is a lemon, tax incentives for the vehicle), a manufacturer's database (e.g., demand of the specific model in the market), and/or other data sources. The system 101 may then compute the TCO using the vehicle deprecation data. For example, the vehicle data retrieved from the manufacturer and dealership databases may indicate an increase in demand for used vehicles of vehicle A's model, and a flat demand for used vehicles of vehicle B's model over the past few years. Accordingly, the system 101 may compute a lower rate of deprecation for vehicle A in comparison with vehicle B, and thus the overall TCO of vehicle A may be lower than vehicle B. As another example, if the data retrieved from a DMV database or other source indicates that vehicle A was previously stolen or totaled, the system 101 may increase the depreciation costs of vehicle A by a predetermined amount or by an increased deprecation percentage.

As described above, in step 203, the vehicle cost estimation system 101 may use the vehicle-specific data retrieved for the vehicle to estimate the costs associated with the ownership and use of that vehicle. The TCO cost factors calculations and the overall TCO calculations may be performed over a period of years specified by a user of the system 101. If no time period is specified by a user, the system 101 may use a pre-determined time period. For example, a prospective buyer may be considering the purchase of a used vehicle that the buyer intends to own and use for the next three years. The buyer, who has budgeted $15,000 to spend on a vehicle over the next three years, may be deciding between two used cars that cost $5,000 and $6,000 respectively. The buyer may input the VIN of the two vehicles in the vehicle cost estimation system 101 and specify a three year time period for TCO computation. Based on the data retrieved from various data sources, including the sources described above, the system 101 may compute the 3-year TCO of the $5,000 vehicle to be $12,000, and may compute the 3-year TCO of the $6,000 vehicle to be $9,000. In this case, the buyer may add the 3-year TCO of each vehicle to the purchase price of the vehicle, and may find that the $6,000 vehicle may better satisfy the buyer's long term vehicle budget despite the vehicle's initially higher purchase price.

The vehicle cost estimation system 101 may use various other types of vehicle data to perform the TCO computations described above. In various embodiments, the system 101 may use few or more factors associated with a specific vehicle in computing the TCO. The various embodiments may also retrieve the data associated with a vehicle from databases different from those described above.

In step 204, the system 101 may output the calculated TCO for the vehicle. The system 101 may output the TCO to a peripheral monitor, printer or other Input/Output 109, and/or may transmit the vehicle TCO to one or more remote devices, for example, the user's personal computer 151, laptop, mobile phone 141, PDA, etc. The TCO also may be transmitted over via a web page or other computer application, or sent to a user in a separate email, SMS, voice message, etc. The TCO output may be formatted in different ways. In certain embodiments, the TCO output may include a breakdown of the various estimates for the different cost factors used in calculating the TCO (e.g., depreciation costs, insurance costs, maintenance costs, fuel costs, taxes and fees, etc.). The estimated costs for the different factors may be displayed aggregated over the specified TCO period or may be displayed separately year-by-year. The output may also include an overall TCO value as an aggregate of all estimated cost factors over the TCO period.

Figure 3:
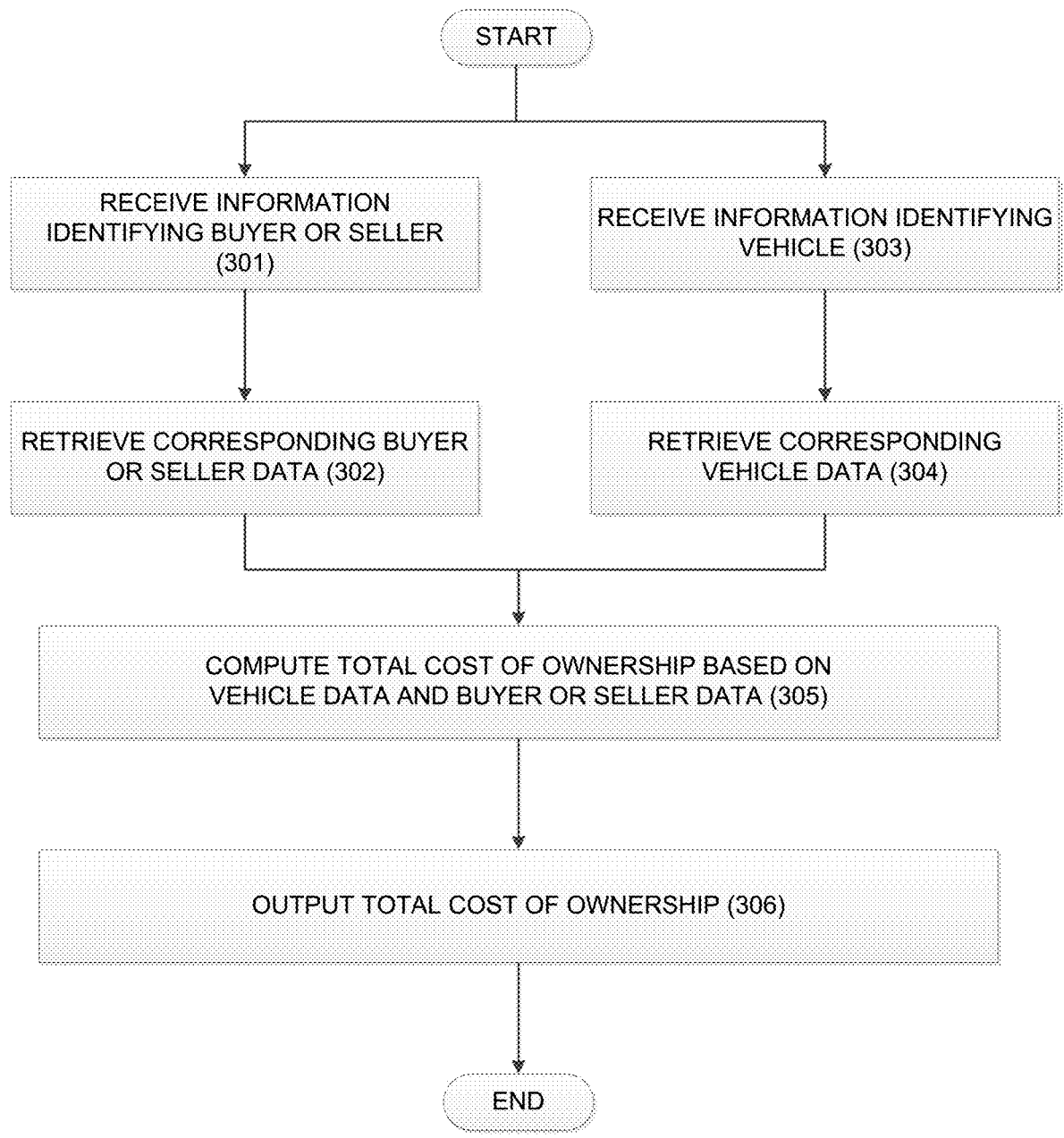
FIG. 3 is a flow diagram illustrating an example method of calculating a total cost of ownership for a vehicle based on vehicle identifying information, and buyer or seller identifying information, according to one or more aspects of the disclosure.

FIG. 3 is a flow diagram illustrating an example method of calculating a TCO for a vehicle based on vehicle data, and based on data corresponding to either a prospective buyer or seller of the vehicle. In step 301, the vehicle cost estimation system 101 may receive information identifying a prospective buyer or seller of the vehicle. In some embodiments, a user may interact with a TCO estimation application executing at a mobile device 141 or remote terminal 151 to indicate to the system 101 that the user is a prospective buyer or seller of the vehicle. The vehicle cost estimation system 101 may then retrieve additional information related to the potential seller using the vehicle registration retrieved using the vehicle's VIN, or other available data related to the potential seller. In other embodiments, a user at a TCO estimation application may transmit the VIN to the system 101, along with information identifying the user (e.g., name, address, social security number, state driver's license number, insurance policy number, etc.), and an indication that the user is either a potential buyer or a seller of the vehicle. For example, a prospective buyer may use a mobile device 141 to transmit to the system 101 information including, a digital image of the VIN tag, indication that the user is a prospective buyer of the vehicle, and one or more additional pieces of identification information of the user. The system 101 may also be used by entities that are neither buyers nor sellers of the vehicle. For example, a used car dealership or other third-party may use the system 101 on behalf of a prospective buyer or seller, or may otherwise have knowledge of a prospective buyer or seller that may be relevant to the TCO calculation.

In step 302, the system 101 may retrieve data corresponding to the entity (i.e., a prospective buyer or seller of the vehicle) using the information received in step 301 (e.g., name, address, social security number, state driver's license number, insurance policy number, etc.). As described above, the vehicle cost estimation system 101 may be configured to access and retrieve data from multiple data sources containing additional data relating to people or organizations with the vehicle. The additional data relating to the entity may be used, along with vehicle data, to calculate an entity-specific TCO for a vehicle. For example, an insurance company database may contain information including a customer's driving record, insurance claims history, and insurance policy preferences (e.g., vendor, types of coverage, deductibles, and other policy options). Additionally, telematics databases maintained by vehicle manufacturers and/or insurance companies may contain sensor data collected from one or more vehicles used by the entity (e.g., the potential buyer or seller of the vehicle). The sensor data may include the entity's driving style (e.g., rates of acceleration and braking, instances of sudden acceleration or braking, fuel economy), geographic location, distance driven per year, ratio of highway to city driving, etc. Financial company databases may contain additional entity information, for example, the entity's credit score and other financial data. Additionally, databases maintained by vehicle dealerships and/or repair shops may contain information including maintenance records of one or more other vehicles associated with the entity.

In some embodiments, steps 303 and 304 of FIG. 3 may be similar to steps 201 and 202 described above in reference to FIG. 2. For example, a user may transmit a vehicle's VIN to the system 101, and the system 101 may retrieve vehicle-specific data from one or more of the various data sources described above. However, in some embodiments, steps 303 and 304 may involve receiving vehicle identifying information and retrieving only non-unique vehicle data (e.g., make, model, year, mileage, engine type, etc.). In some examples, the system 101 may calculate an initial TCO based on entirely or partially non-vehicle specific data, and then adjust the calculated TCO based on the prospective buyer or seller data. For example, the system 101 may determine an initial estimated fuel cost for a TCO calculation using a default value, a manufacturer's MPG rating of the vehicle, or using vehicle-specific MPG data determined from the vehicle's maintenance records and/or operational sensors. Then, using additional data retrieved in step 302 relating to one or more other vehicles previously used by a prospective buyer (e.g., vehicle sensor data, insurance records, or vehicle maintenance records for the buyer's previous vehicles, etc.), the system 101 may determine that the buyer is an aggressive driver (e.g., has high rates of acceleration and braking, regularly exceeds target RPM recommendations, drives with low tire pressure, etc.). Based on this determination regarding the prospective buyer, the system 101 may update the TCO calculation to use a lower estimated MPG rating to account for the higher fuel consumption that may occur due to the prospective buyer's aggressive driving. Because of the estimated higher fuel consumption, the entity-specific TCO calculation for the prospective buyer may be higher than the initially determined TCO based only on the vehicle data.

In step 305 the vehicle cost estimation system 101 may compute a TCO of the vehicle based on vehicle data (including vehicle-specific data and/or non-vehicle-specific data), as well as based on entity-specific data relating to the prospective buyer or seller of the vehicle. As described in the examples below, the system 101 may use both the prospective entity data retrieved in step 302, and vehicle data retrieved in step 304, to compute the TCO of the vehicle. Certain additional steps in TCO calculation in step 305 may be similar to the steps performed by the vehicle cost estimation system 101 in step 204.

As noted above, a TCO computation may include estimated financing costs associated with the purchase of the vehicle. In certain examples, prospective buyer entity data may be used to estimate the financing costs associated with the purchase of the vehicle. For example, the system 101 may retrieve financial data associated with the prospective buyer (e.g., account data, credit score, etc.) from a bank or credit-rating agency database using the buyer's name, social security number, or other data received in step 301. Using the buyer's financial data, the system 101 may then estimate the financing costs (e.g., interest rates, down-payment, financial fees, etc.) associated with the purchase of the vehicle by the prospective buyer over the TCO period.

The prospective buyer's or seller's driving data may also be used to estimate fuel costs as part of an entity-specific TCO calculation. For example, the system 101 may retrieve vehicle sensor data for one or more cars previously owned by the buyer or seller from one or more insurance company telematics databases or other data sources. The retrieved data may include information comprising the prospective buyer's or seller's driving style (e.g., rates of acceleration and braking), the miles travelled per year, ratio of highway and city driving, cost of fuel in the buyer's or seller's geographic location, and the like. The system 101 may retrieve a current MPG for the vehicle, as described above. The system 101 may then increase or decrease the vehicle's MPG rating depending upon whether the vehicle data for the buyer's and/or seller's previous vehicles indicates that the buyer or seller is a conservative (high MPG) or aggressive (low MPG) driver. MPG rating associated with a buyer or seller with good driving habits (e.g., steady acceleration and braking rates, lower city miles) will be higher than another buyer or seller with aggressive driving habits (e.g., rapid acceleration and braking rates, higher city miles). For example, if the prospective buyer of the vehicle has a high MPG rating, the system may increase the vehicle MPG rating for the specific buyer as compared to other potential buyers with lower MPG ratings. On the other hand, if the seller of the vehicle has a high MPG rating (based on the data retrieved for the seller's other vehicles), then the system 101 may decrease the vehicle's MPG rating based on a determination that the vehicle's high MPG rating is partially attributable to the conservative driving of the seller. After determining the entity-specific MPG rating for the vehicle, the system 101 may then estimate the fuel that will be consumed by vehicle when owned and used by the prospective buyer using the revised MPG rating.

The TCO calculation may also include entity-specific data in estimating maintenance and repair costs associated with the vehicle. For example, data relating to a prospective buyer's or seller's driving record, geographic location (for road and weather conditions), and data associated with other vehicles of the buyer or seller (e.g., maintenance and repair data, insurance claims, and driving style data) may be retrieved from data sources such as insurance company databases, governmental driving databases, manufacturer databases, and vehicle dealerships and/or repair shops. In computing a TCO, the system 101 may use buyer- or seller-specific data to estimate the future maintenance and repair costs of the current vehicle over the TCO period. For example, future maintenance and repair costs for vehicles owned by sellers with good driving habits and clean driving records may be lower in comparison with vehicles owned by sellers with aggressive driving habits and accident histories. Accordingly, when the system 101 determines that the prospective seller (and/or the prospective buyer) has good driving habits, performs regular maintenance on their vehicles, and primarily drives in a geographic region with good roads and weather conditions, the system 101 may lower an estimated maintenance and repair cost factor for the calculated TCO. In contrast, when the prospective seller (and/or the prospective buyer) has bad driving habits, does not perform regular maintenance on their vehicles, and drives in a geographic region with bad roads and weather conditions, the system 101 may increase an estimated maintenance and repair cost TCO factor based on these determinations.

The TCO computation may also include entity-specific estimates of insurance costs associated with the vehicle. For example, the system 101 may retrieve data in step 302 regarding a prospective vehicle buyer's insurance claims and preferences (e.g., insurance vendor, types of coverage, deductibles, and other policy options), as well as the prospective buyer's driving records, geographic location, etc., from an insurance company database or other data source. When calculating the TCO, the system 101 may use the prospective buyer's insurance data (retrieved in step 304), as well as data relating to the insurance costs of the vehicle itself (retrieved in step 304) to estimate the costs of the insuring the vehicle for the prospective buyer. For example, the costs of insuring a sports car instead of a minivan may be higher for all drivers, but there may be a greater difference in the insurance rates for a prospective buyer with aggressive driving habits as compared to a buyer with safe driving habits. Accordingly, the insurance cost factor of the TCO calculation for the same sports car may be higher for the one prospective buyer than for another prospective buyer.

In certain examples, the corresponding buyer or seller data retrieved in step 304, and used in the TCO calculation of step 305, might not correspond to the legal prospective buyer or seller of the vehicle, but rather to another entity/individual associated with legal buyer or seller. For example, if the prospective seller (or buyer) of the vehicle was not (or will not be) the primary driver, then the data retrieved in step 304 may include both the relevant data corresponding to the legal prospective buyer or seller, as well as data corresponding to the associated primary driver. For example, if a parent purchasing a vehicle for his or her teenaged child, then the relevant prospective buyer data retrieved in step 304 may include data relating to the child (e.g., demographics, driving style, driving record, etc.) in addition to the relevant data for the parent (e.g., financing data, maintenance habits, applicable tax incentives, etc.). Similarly, if the prospective seller was not the primary driver of the vehicle, then the prospective seller data retrieved in step 304 may include the relevant data for both the prospective legal seller and the primary driver of the vehicle while it was owned by the seller.

The TCO calculations described above in step 305 describe using data relating to the current prospective seller, however, additional data relating to previous sellers of the same vehicle also may be used in the TCO calculations described herein. For example, if the prospective seller has owned the vehicle for a relatively short period of time, then one or more previous owners may be identified so that additional previous owner data may be retrieved and used in the TCO calculation in a similar manner as the information retrieved for the prospective seller.

In step 306, the vehicle cost estimation system 101 may output the entity-specific TCO calculations for the vehicle. The output step may be similar to step 204, described above. In some examples, the system 101 may output the prospective entity data used in the TCO calculation (i.e., prospective buyer data and/or prospective seller data), in addition to the vehicle data used in computing the TCO.

Figure 4:
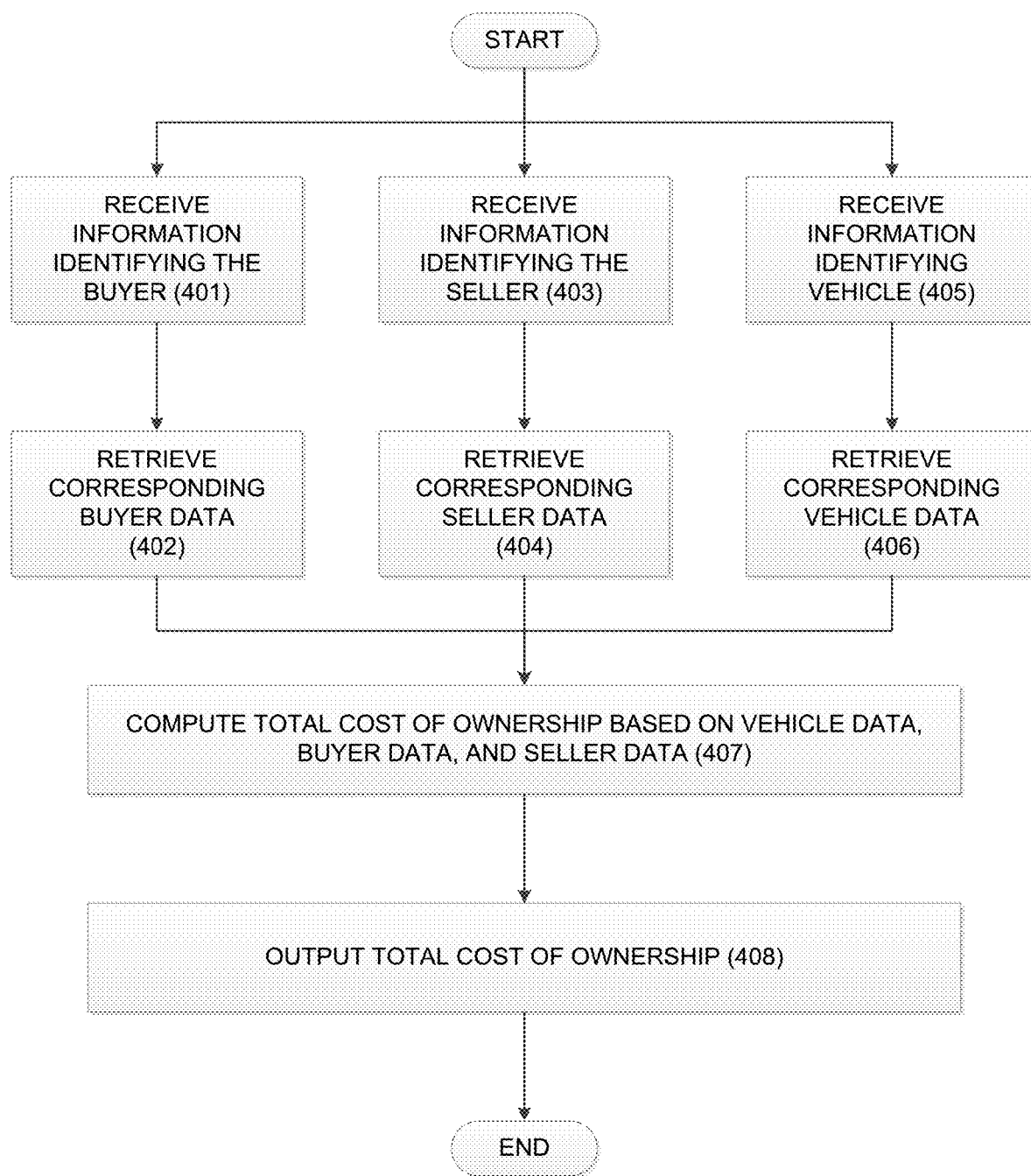
FIG. 4 is a flow diagram illustrating an example method of calculating a total cost of ownership for a vehicle based on vehicle identifying information, buyer identifying information, and seller identifying information, according to one or more aspects of the disclosure.

FIG. 4 is a flow diagram illustrating an example method of calculating a TCO for a vehicle using data corresponding to a prospective buyer of a vehicle, data corresponding to a prospective seller of the vehicle, as well as data corresponding to the vehicle itself. Steps 401 (receiving information identifying the buyer) and 403 (receiving information identifying the seller) each may be similar to step 301 (receiving information identifying a buyer or seller), described above in FIG. 3, and steps 402 (retrieving corresponding buyer data) and 404 (retrieving corresponding seller data) each may be similar to step 302 (retrieving corresponding buyer or seller data). Steps 405 (receiving information identifying a vehicle) and 406 (retrieving corresponding vehicle data) may be similar to steps 201 (receiving information identifying a vehicle) and 202 (retrieving corresponding vehicle data) respectively, described above in reference to FIG. 2.

Although some vehicle identifying information is necessary for a TCO calculation, the system 101 might not receive information that uniquely identifies the vehicle. For example, in step 405 the system 101 may only receive a vehicle's make, model, year, engine type, mileage and/or condition. In other examples, the system may receive vehicle-specific information as described above in reference to FIG. 2. In either case, the system 101 may also receive information identifying a prospective buyer (step 401) and a prospective seller (step 402) of the vehicle. In certain embodiments, the system 101 may initially create a TCO based only on the vehicle data received in step 403, and then may adjust the TCO calculation based on the prospective buyer and prospective seller data. For example, after calculating an initial TCO for a first vehicle, the system 101 may receive additional prospective buyer data and seller data for a first possible buyer and seller of the vehicle. For instance, the system 101 may receive seller maintenance data from a vehicle dealership database indicating that the seller has a poor history of maintenance for the seller's other vehicles. The system 101 also may receive data from the buyer's insurance database that indicates that the buyer has totaled several previous vehicles. The resulting adjusted TCO for the prospective buyer and seller combination may be higher in this case than the initial TCO calculation based only on the vehicle data. For a second prospective buyer and seller of the same vehicle, the system 101 may receive buyer and seller maintenance data from vehicle dealership databases that indicates that the buyer and seller both have a good vehicle maintenance history, and have never been involved in an accident. Accordingly, the adjusted TCO of the same vehicle may be lower for the second prospective set of buyer and seller in comparison with the adjusted TCO for the first prospective buyer and seller, based on the higher estimated maintenance and insurance costs for the first prospective buyer and seller In step 407, the data corresponding to the prospective buyer and the prospective seller retrieved in steps 402 and 404, respectively, and vehicle data retrieved in step 406 may be used together to calculate a buyer-specific and seller-specific TCO of the vehicle. For example, in step 406, a regular maintenance schedule of the vehicle may be retrieved from the vehicle manufacturer's database using the vehicle's VIN. In step 404, data relating to a prospective seller's driving record, geographic location (for road and weather conditions etc.), and driving style data (based on the seller's other vehicles), may be retrieved from the prospective seller's insurance company database, one or more vehicle manufacturer databases, vehicle dealerships, and/or repair shops associated with the seller's previous or current vehicles. The retrieved seller data may be used to determine the existing condition of the vehicle and to estimate the need for future maintenance and repairs. In step 402, data relating to a prospective buyer's driving record, geographic location, driving style, and other factors may be used to determine the likelihood of the need for future maintenance and repairs, as well as the estimated cost of fuel, service, and repairs in the buyer's geographic area. Further, data about a prospective buyer's driving frequency and extent of vehicle usage may be used to determine fuel costs, insurance costs, depreciation costs, and the estimated frequency of dealership visits for scheduled maintenance. In this example, the vehicle data, prospective seller data, and prospective buyer data may be used together to better estimate the various cost factors in a TCO calculation.

As another example, the vehicle data retrieved using the vehicle's VIN may be used to access vehicle manufacturer databases to determine the demand of the vehicle type in the local market of the prospective buyer, and to access a governmental database to identify any applicable tax incentives for buying the vehicle. The prospective seller's driving record and insurance claim data may be retrieved from an insurance company database associated with the seller, and seller driving data recorded by sensors in the vehicle may be retrieved from a telematics database. In this example, the retrieved seller data may be used to better determine the vehicle's existing condition. Prospective buyer information, such as the buyer's geographic location may be retrieved from an insurance company database associated with the buyer, and an estimated demand for the vehicle in the geographic region of the buyer may be retrieved from a manufacturer database or other source. Additionally, driver data for the prospective buyer recorded by operational driving sensors in the buyer's current or previous vehicles may be retrieved from a telematics database, the buyer's vehicle driving record, driving style, and vehicle maintenance habits may be retrieved from insurance databases, governmental databases (e.g., state DMVs), vehicle dealership or repair shop databases, and/or other data sources with buyer data. As in the previous example, the vehicle data, prospective seller data, and prospective buyer data may be used together in this example to better estimate the various cost factors in the TCO calculation.

The TCO calculations described herein may assist parties involved in the buying or selling of a vehicle. For example, a prospective car buyer may have an option between buying a used Sports Utility Vehicle (SUV) for $7,500 and a used gas-electric hybrid vehicle for $15,000. The buyer may live in an urban area with high fuel prices but may have a short commute to work. The buyer's commute may be mostly on city streets and may involve frequent braking. In this example, the manufacturer's data for the hybrid vehicle may show that the vehicle reports higher fuel efficiency under frequent braking. The manufacturer's data may also show an increase in demand of the used hybrid vehicle in the prospective buyer's region. Further, the buyer's state may offer a tax rebate for hybrid vehicle purchasers and/or owners. Additional buyer data may indicate that the prospective buyer is an aggressive driver and the prospective buyer's insurance data and driving record may indicate that the buyer would likely be required to pay a higher insurance premium for a SUV in comparison to a hybrid vehicle. Insurance data or governmental crime data may also indicate a high theft rate for SUVs in the buyer's area. After using the vehicle data retrieved from the VIN of the SUV, the hybrid vehicle, and the buyer's data retrieved from the sensors of the buyer's current vehicle, the vehicle cost estimation system 101 may estimate TCOs for the SUV and the hybrid vehicles over a five-year period as $45,000 and $37,500 respectively. Consequently, in the example, the SUV may be $7,500 cheaper than the hybrid vehicle at the time of the purchase, but the hybrid may be the less expensive option for the buyer over the buyer's anticipated period of ownership.

Continuing the same example, the system 101 may also receive and retrieve information about the owners-cum-sellers of the SUV and the hybrid vehicle. In this example, the data corresponding to the seller of the SUV may indicate that seller is an aggressive driver (based on the data recorded from the sensors on the seller's other vehicle), lives close to a body of salt water, and does not garage the SUV. Vehicle data from manufacturers may indicate that vehicles rust faster when near salt water lakes or oceans. Seller data for the seller of the hybrid vehicle may indicate that the seller is a safe driver, lives in an urban area with moderate climate, and uses an indoor garage for parking (e.g., based on data retrieved from the seller's insurance company, governmental records, and/or vehicle maintenance records for the seller's other vehicles). After factoring in the additional data for the sellers of both vehicles, the SUV's 5-year TCO may increase because of an increase in estimated maintenance and repair costs, and the hybrid's 5-year TCO may decrease due to a decrease in estimated maintenance costs. For instance, the vehicle cost estimation system 101 in this example may estimate the 5-year TCOs for the SUV and the hybrid vehicle as $52,000 and $36,000, respectively.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

The invention claimed is:

1. A system comprising:
a vehicle operation sensor device attached to a first vehicle associated with a prospective buyer of a second vehicle and configured to capture first vehicle operational data for the first vehicle; and
one or more vehicle cost estimation servers comprising:
at least one hardware processor; and
memory storing computer-executable instructions that, when executed by the at least one hardware processor, cause the one or more vehicle cost estimation servers to:
receive, from the vehicle operation sensor device, the first vehicle operational data;
store the first vehicle operational data;
receive buyer identification information identifying the prospective buyer of the second vehicle;
based on the buyer identification information, retrieve buyer driver data determined based on the received first vehicle operational data for the first vehicle associated with the prospective buyer;
determine, based on the retrieved buyer driver data, that the prospective buyer has a specific driving habit;
receive, from a mobile device associated with the prospective buyer via a wireless communication network, a digital image of at least a portion of the second vehicle captured by a camera of the mobile device;
analyze the digital image to determine vehicle identification information identifying the second vehicle;
retrieve, from a database based on the determined vehicle identification information, a mile-per-gallon rating for the second vehicle;
adjust the mile-per-gallon rating based on the determination that the prospective buyer has the specific driving habit and determine an adjusted mile-per-gallon rating;
estimate, using the adjusted mile-per-gallon rating, a fuel cost over a first period of time and associated with the prospective buyer driving the second vehicle;
calculate, based on the estimated fuel cost, a cost of ownership over a second period of time of the second vehicle by the prospective buyer; and
transmit, to the mobile device, the calculated cost of ownership.

2. The system of claim 1, further comprising:
a second vehicle operation sensor device configured to capture second vehicle operational data for the second vehicle associated with a prospective seller,
wherein the computer-executable instructions, when executed by the at least one hardware processor, cause the one or more vehicle cost estimation servers to:
retrieve seller driver data determined based on the second vehicle operational data for the second vehicle associated with the prospective seller; and
calculate the cost of ownership based on the seller driver data.

3. The system of claim 2,
wherein the seller driver data comprises demographic data associated with the prospective seller and wherein the second vehicle operational data for the second vehicle comprises rates of acceleration or braking of the second vehicle, and
wherein the buyer driver data comprises demographic data associated with the prospective buyer and wherein the first vehicle operational data for the first vehicle comprises rates of acceleration or braking of the first vehicle.

4. The system of claim 2, wherein the seller driver data comprises at least one of:
driving record data associated with the prospective seller,
demographic data associated with the prospective seller,
one or more insurance policy preferences associated with the prospective seller,
one or more insurance records associated with the prospective seller, or
one or more maintenance records associated with the prospective seller.

5. The system of claim 1, wherein the buyer driver data comprises at least one of:
driving record data associated with the prospective buyer,
demographic data associated with the prospective buyer,
one or more insurance policy preferences associated with the prospective buyer,
one or more insurance records associated with the prospective buyer, or
one or more maintenance records associated with the prospective buyer.

6. A method comprising:
receiving, by one or more computing devices via a network from a first operational sensor attached to a first vehicle of a prospective buyer of a second vehicle, first vehicle operational data;
storing the first vehicle operational data;
receiving buyer identification information identifying the prospective buyer of the second vehicle;
based on the buyer identification information, retrieving, by the one or more computing devices, buyer driver data determined based on the received first vehicle operational data;
determining, by the one or more computing devices based on the retrieved buyer driver data, that the prospective buyer has a specific driving habit;
receiving, from a mobile device associated with the prospective buyer via a wireless communication network, a digital image of at least a portion of the second vehicle captured by a camera of the mobile device;
analyzing the digital image to determine vehicle identification information identifying the second vehicle;
retrieving, from a database based on the determined vehicle identification information, a mile-per-gallon rating for the second vehicle;
adjusting the mile-per-gallon rating based on the determination that the prospective buyer has the specific driving habit and determining an adjusted mile-per-gallon rating;
estimating, using the adjusted mile-per-gallon rating, a fuel cost over a first period of time and associated with the prospective buyer driving the second vehicle;
calculating, based on the estimated fuel cost, a cost of ownership over a second period of time of the second vehicle by the prospective buyer; and transmitting, to the mobile device, the calculated cost of ownership.

7. The method of claim 6, further comprising:
retrieving seller driver data associated with a prospective seller of the second vehicle; and
wherein the calculating the cost of ownership is based on the seller driver data.

8. The method of claim 7, wherein the seller driver data comprises an insurance claim history indicating insurance claims made by the prospective seller.

9. The method of claim 7, wherein the seller driver data comprises demographic data associated with the prospective seller.

10. The method of claim 6, further comprising:
calculating, by the one or more computing devices using a deductible selected by the prospective buyer, an estimated cost of insurance for the prospective buyer to insure the second vehicle over the second period of time,
wherein the calculating the cost of ownership is based on the estimated cost of insurance.

11. The method of claim 6, further comprising:
receiving, from a second operational sensor associated with the second vehicle, second vehicle operational data; and
retrieving seller driver data determined based on the second vehicle operational data,
wherein the calculating the cost of ownership is based on the seller driver data.

12. The method of claim 11,
wherein the second vehicle operational data comprises rates of acceleration or braking of the second vehicle, and
wherein the first vehicle operational data comprises rates of acceleration or braking of the first vehicle.

13. The method of claim 6, further comprising:
retrieving a maintenance schedule for the second vehicle; and
estimating, using the maintenance schedule, a maintenance cost for maintaining the second vehicle over the second period of time,
wherein the cost of ownership is based on the estimated maintenance cost.

14. The method of claim 6, wherein the estimating the fuel cost is based on a measurement of fuel efficiency detected by a sensor associated with the second vehicle.

15. The method of claim 6, wherein the calculating the cost of ownership comprises:
calculating, based on driving behavior information for the prospective buyer, an insurance premium for insuring the second vehicle; and
calculating, based on the insurance premium, an insurance cost for the prospective buyer to insure the second vehicle over the second period of time,
wherein the cost of ownership is calculated based on the insurance cost.

16. The method of claim 6, wherein the calculating the cost of ownership comprises:
calculating a cost of maintenance for the second vehicle based on information indicating a make, model, and year of manufacture of the second vehicle; and
increasing or decreasing the cost of maintenance for the second vehicle based on at least a portion of the first vehicle operational data.

17. The method of claim 6, further comprising:
retrieving, from a credit-rating agency database, a credit score for the prospective buyer; and
estimating, using the credit score for the prospective buyer, a financing cost associated with the prospective buyer purchasing the second vehicle,
wherein the cost of ownership is based on the financing cost.

18. One or more non-transitory computer-readable media storing computer-executable instructions that, when executed by one or more processors, cause one or more computing devices to:
receive, via a network from a first operational sensor attached to a first vehicle of a prospective buyer of a second vehicle, first vehicle operational data;
store the first vehicle operational data;
receive buyer identification information identifying the prospective buyer of the second vehicle;
based on the buyer identification information, retrieve buyer driver data determined based on the received first vehicle operational data;
determine, based on the retrieved buyer driver data, that the prospective buyer has a specific driving habit;
receive, from a mobile device associated with the prospective buyer via a wireless communication network, a digital image of at least a portion of the second vehicle captured by a camera of the mobile device;
analyze the digital image to determine vehicle identification information identifying the second vehicle;
retrieve, from a database based on the vehicle identification information, a mile-per-gallon rating for the second vehicle;
adjust the mile-per-gallon rating based on the determination that the prospective buyer has the specific driving habit and determine an adjusted mile-per-gallon rating;
estimate, using the adjusted mile-per-gallon rating, a fuel cost over a first period of time and associated with the prospective buyer driving the second vehicle;
calculate, based on the estimated fuel cost, a cost of ownership over a second period of time of the second vehicle by the prospective buyer; and
transmit, to the mobile device, the calculated cost of ownership.

19. The one or more non-transitory computer-readable media of claim 18, wherein the computer-executable instructions, when executed, cause the one or more computing devices to calculate the cost of ownership based on an estimated cost of insurance for insuring the second vehicle.

20. The one or more non-transitory computer-readable media of claim 18, wherein the computer-executable instructions, when executed, cause the one or more computing devices to calculate the cost of ownership based on an estimated maintenance cost for maintaining the second vehicle.

* * * * *